United States Patent [19]

MacPherson, Jr. et al.

[11] Patent Number: 4,938,785
[45] Date of Patent: Jul. 3, 1990

[54] GAS-LIQUID SEPARATION

[75] Inventors: Robert E. MacPherson, Jr., Oak Ridge; Arthur P. Fraas, Knoxville; Doan L. Phung, Oak Ridge, all of Tenn.

[73] Assignee: PAI Corporation, Oak Ridge, Tenn.

[21] Appl. No.: 377,627

[22] Filed: Jul. 10, 1989

Related U.S. Application Data

[63] Continuation-in-part of Ser. No. 223,281, Jul. 22, 1988, abandoned.

[51] Int. Cl.$^5$ ............................................. B01D 45/08
[52] U.S. Cl. ........................................... 55/1; 55/15; 55/189; 55/277; 55/439; 55/444; 55/461
[58] Field of Search ....................... 55/1, 15–17, 55/158, 159, 189, 277, 439, 440, 444, 461, 468

[56] References Cited

U.S. PATENT DOCUMENTS

| | | | |
|---|---|---|---|
| 1,519,428 | 12/1924 | Wilisch . | |
| 2,857,979 | 10/1958 | Van Dijck | 55/1 X |
| 3,169,038 | 2/1965 | Pendleton | 55/468 X |
| 3,182,674 | 5/1965 | Horton | 55/1 X |
| 3,353,335 | 11/1967 | Caballero | 55/94 |
| 3,403,498 | 10/1968 | Pasha | 55/90 |
| 3,523,408 | 8/1970 | Rosenberg | 55/159 |
| 3,528,216 | 9/1970 | Garrett | 55/15 |
| 3,528,217 | 9/1970 | Garrett | 55/15 |
| 3,528,218 | 9/1970 | Garrett et al. | 55/15 |
| 3,528,221 | 9/1980 | Garrett et al. | 55/277 X |
| 3,559,373 | 2/1971 | Garrett | 55/277 X |
| 3,650,093 | 3/1972 | Rosenberg | 55/159 |
| 3,828,524 | 8/1974 | Booth et al. | 55/159 X |
| 4,218,314 | 8/1980 | Schubert et al. | 55/17 X |
| 4,292,050 | 9/1981 | Lindhardt et al. | 55/1 |
| 4,319,891 | 3/1982 | Anderson et al. | 55/277 X |
| 4,378,976 | 4/1983 | Rush | 55/277 X |
| 4,504,285 | 3/1985 | Modisette | 55/17 X |

OTHER PUBLICATIONS

G. J. Parker et al., The Collision of Drops with Dry and Wet Surfaces In An Air Atmosphere, Proc Instn Mech. Engrs., 1969–70, Mar. 25, 1970, vol. 184, Part 3 G(III), pp. 57–63.
O.S. Torch Et al., Industrial Separators for Gas Cleaning, 1979, Elsevier Publishing Co.
H. J. Van Ebbenhorst Tengbergen, The Separation of Liquids from Gases by Cyclones, 1961.
R. L. Garrett et al., Vapor–Liquid Separation at Supersonic Velocities, Nov. 1968, pp. 609–612.

Primary Examiner—Robert Spitzer
Attorney, Agent, or Firm—Luedeka, Hodges & Neely

[57] ABSTRACT

The specification discloses an apparatus and method for separating liquid droplets carried in a gas wherein the gas is conducted at a subsonic velocity below about Mach 0.7 through a conduit, the walls of which define successive, generally oppositely directed arcuate bends to cause transverse movement of the droplets toward and into contact with the walls by centrifugal force and in a manner which avoids conditions giving rise to flow separation and any attendant turbulence and pressure drop. The walls include a porous medium covering at least a portion of the surface thereof and through which liquid directed against the wall is withdrawn from the conduit. According to one aspect of the invention, a porous medium is provided on the stator blades of a turbine power generator to enable removal of accumulated liquid thereon and thereby reduce rotor blade erosion and power losses associated with dribble from the stator blades onto the rotor blades.

10 Claims, 4 Drawing Sheets

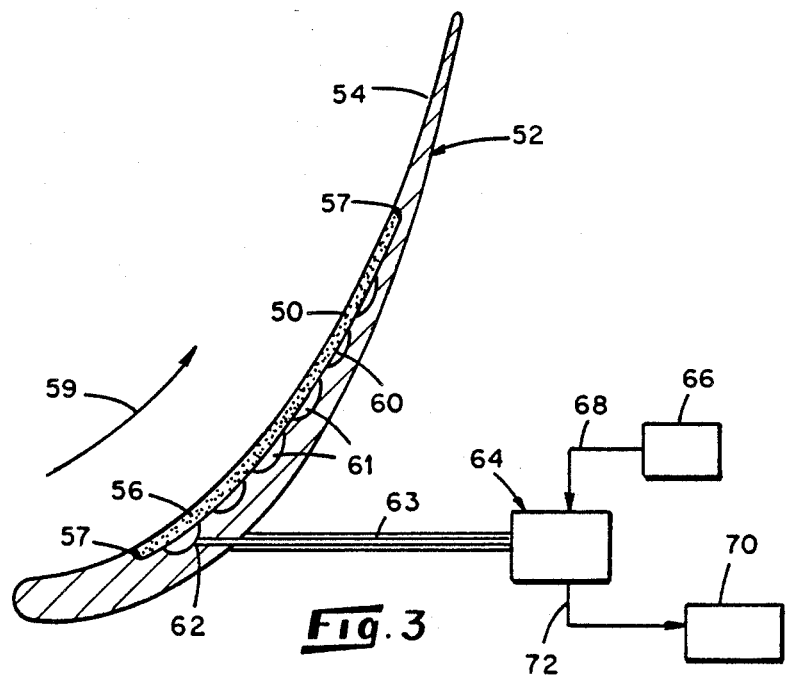
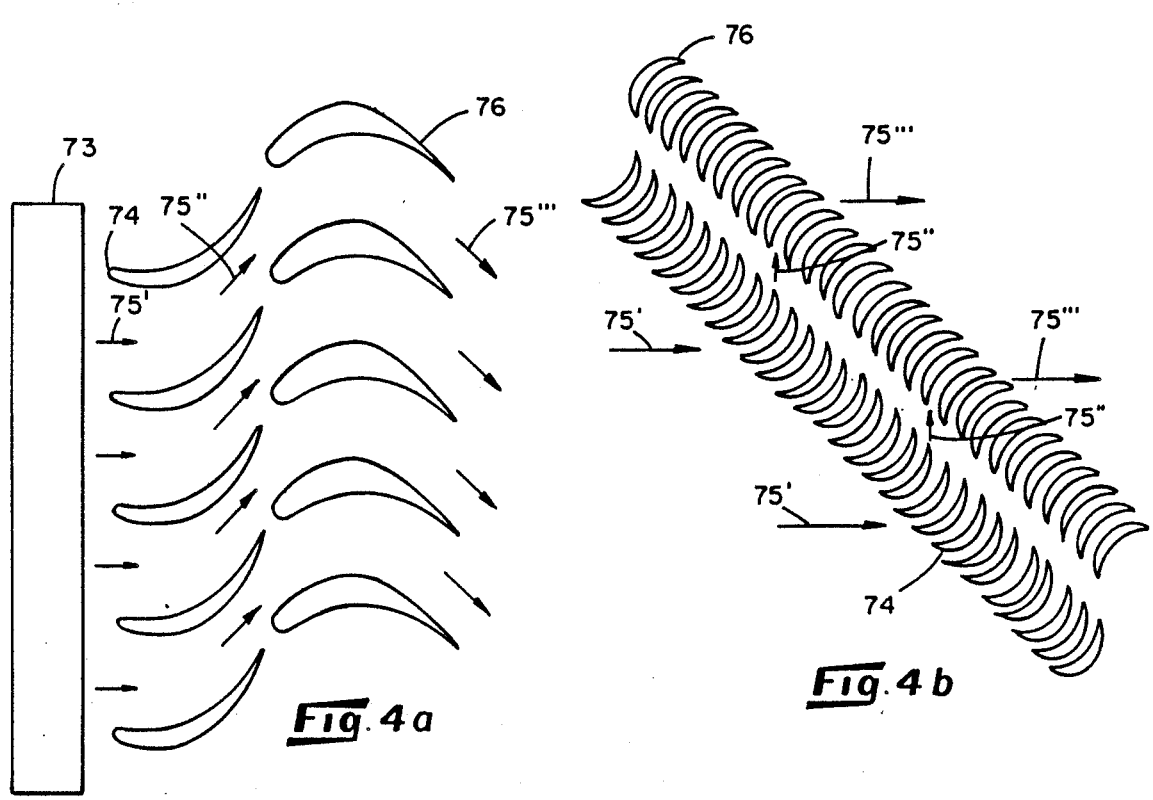

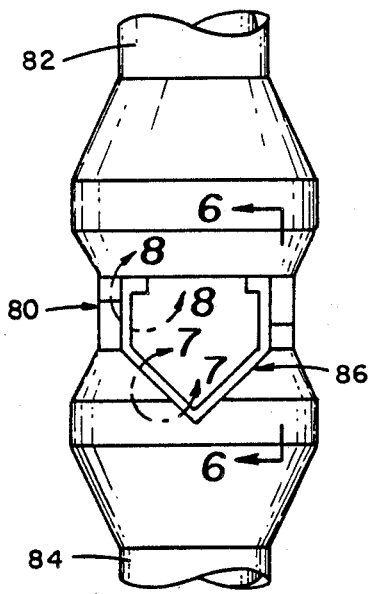
Fig. 5
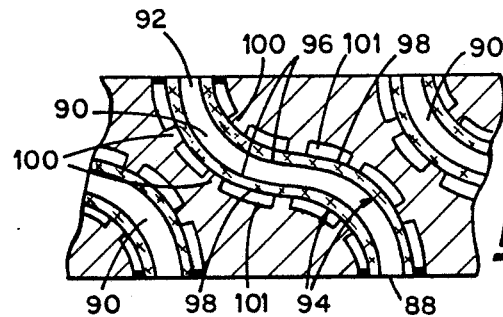
Fig. 6
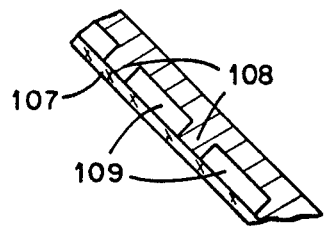
Fig. 7
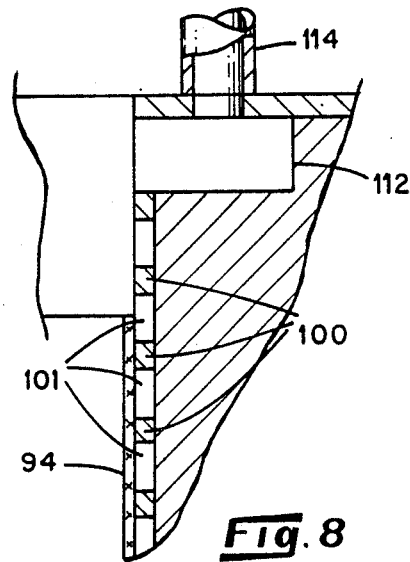
Fig. 8
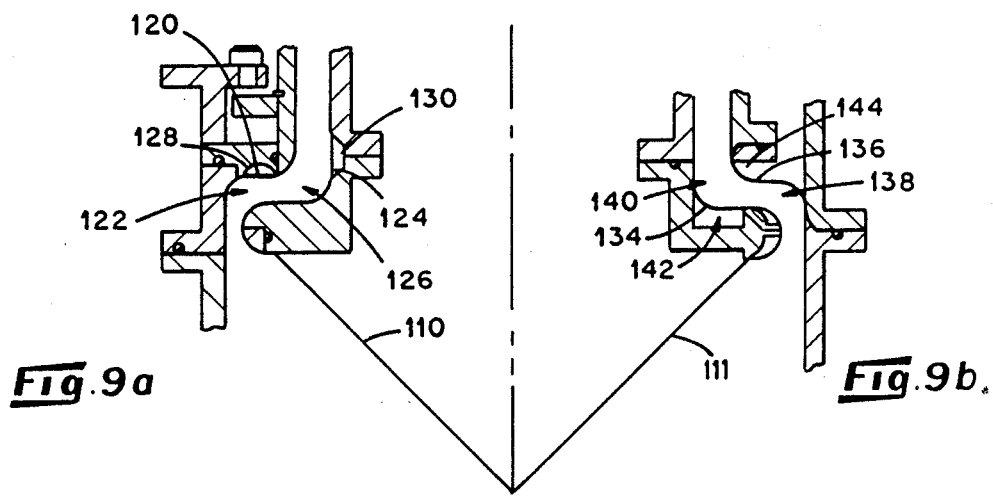
Fig. 9a
Fig. 9b

GAS-LIQUID SEPARATION

This application is a continuation-in-part of application Ser. No. 07/223,281 filed July 22, 1988, now abandoned.

The present invention relates to methods and apparatus for separating liquid droplets carried in a flowing gas stream.

In many industrial processes, the presence of suspended liquid droplets in a flowing gas stream is undesirable. A prime example of this is the Rankine cycle employed in the electric power generating industry which uses steam generators and steam turbines to produce electricity. There, it is essential to keep the amount of suspended liquid in the vapor entering the turbine below acceptable levels to promote the desired energy transfer, keep pressure drops within predefined limits, and to minimize deleterious effects on the equipment such as the turbine rotor blades caused by the presence of water in a liquid state. A similar situation prevails for the potassium vapor Rankine cycle system, a candidate for power generation in space, which also requires high quality vapor (very low liquid content) for efficient operation. (The terms "vapor" and "gas" are used synonymously herein.) Other applications include removal of moisture droplets formed in refrigerated air streams, cooled vapor streams from distillation processes, etc.

Conventional techniques for separating droplets carried in a flowing gas stream require relatively large volumes to achieve the necessary vapor quality. In a typical nuclear power plant installation, for example, the vapor-liquid separator consumes as much as one-third of the volume of the steam generator. This adds greatly to the overall expense and weight of the system. In the potassium vapor Rankine cycle, the questionable effectiveness coupled with the weight and volume contribution of existing vapor-liquid separators had been a significant impediment to the development of a viable zero-gravity electrical generation system for space applications.

Although many attempts have been made to devise improved vapor-liquid separation techniques, little progress has been achieved. Most attempts have involved refinements or rearrangements of existing vapor-liquid separators which typically rely on changing the flow path of the vapor to drive the liquid droplets across the streamlines to a surface, permitting the liquid to drain down the surface under the action of gravity, and then collecting it and returning it to the cycle. This fundamental approach has remained essentially unchanged and the problems associated with it have been more or less accepted. For example, since the conventional approach employs the drainback principle, reentrainment of liquid is a persistent problem because of the intimate contact between the draining liquid and the flowing vapor.

Proposed approaches to the problem of vapor-liquid separation are disclosed in U.S. Pat. Nos. 3,528,216 and 3,528,217 to Garrett, in U.S. Pat. No. 2,857,979 to W. J. D. Van Dijck, and in U.S. Pat. No. 4,292,050 to Linhardt et al. The patents to Garrett disclose the use of a single curved permeable wall against which liquid droplets and solid particles in a flowing gas stream are inertially directed. The droplets are formed by expansion cooling at supersonic velocities in an effuser upstream of the wall. In Garrett '217, a liquid film from an external source is introduced onto the surface of the permeable wall to entrap liquid condensate. In both Garrett '216 and Garrett '217 the separated liquid, together with entrapped gas, is collected behind the wall for disposition or recycling as desired. The gas/liquid separator of U.S. Pat. No. 2,857,979 to Van Dijck is a cyclone separator which also uses a permeable wall for removing liquid that is inertially directed against the wall by the swirling motion of the gas. The flow rate of liquid through the wall is controlled to prevent breakage of a liquid film therein so that the passage of vapor through the wall is minimized. The separator disclosed in U.S. Pat. No. 4,292,050 to Linhardt et al. is a supersonic device like that of the Garrett patents. The separator contains transition zones for accelerating the flow to supersonic so that condensation and particle nucleation will occur. Linhardt uses a wedge member in the flow to create a shock zone which, together with the curvature of the duct, is said to cause the particles to diverge from the flow path and move into a slot where they are collected and removed.

Each of the approaches disclosed in the aforementioned patents suffer from the disadvantage that they entail large pressure drops making them unsuitable for many large scale applications such as in electric power plants, for example. In particular, the separators disclosed by Garrett and Lindhart et al. are based on the premise that supersonic flow velocities must be achieved in order to obtain separation. However, these flow conditions will tend to create oblique shocks and turbulent flow with considerable pressure losses. And the cyclone separator disclosed by Van Dijck is inherently inefficient from the standpoint of pressure losses due to the unstable and turbulent flow conditions which exist in the swirling flow pattern of the gas through the device. Also, in each of the aforedescribed approaches, the difficulties involved in achieving a high separation efficiency are exacerbated by the unstable flow conditions tending to cause reentrainment of deposited liquid and generally interfering with desired inertial movement of the liquid toward the wall for collection and removal.

Accordingly, it is an object of the present invention to provide a method and apparatus for removing liquid droplets carried in a flowing vapor stream.

A further object of the invention is the provision of a method and apparatus of the character described which minimizes reentrainment of liquid separated from the vapor.

Another object of the invention is to provide a method and apparatus for removing liquid droplets carried in a flowing vapor stream without significant concomitant vapor removal.

Yet another object of the invention is the provision of a method and apparatus of the character described which is highly effective in removing the liquid droplets with a minimum pressure drop.

An additional object of the invention is to provide an apparatus and method of the character described which is effective in separating droplets of only a few microns at flow velocities considerably below supersonic.

A further object of the invention is the provision of an apparatus and method of the character described which is useful in removing accumulated moisture from turbine stator blades.

Still another object of the invention is the provision of a method and apparatus of the character described which is compact and simple in construction and operation, and which is readily adaptable for use in a wide variety of applications, particularly the separation of liquid droplets carried in a flowing gas stream in water-steam and metal vapor Rankine cycles.

These and other objects and advantages of the present invention will become apparent and may best be understood with reference to the following detailed description of preferred embodiments of the invention when considered in conjunction with the accompanying drawings in which:

FIG. 3 is a schematic view illustrating the use of a porous medium in a turbine stator blade to provide for removal of liquid droplets on the blade and droplets carried in a vapor stream flowing past the blade in accordance with the present invention;

FIGS. 4a and 4b are schematic views illustrating flow geometries in various arrangements of the stator blades depicted in FIG. 3;

FIG. 5 is a schematic view illustrating the use of a porous medium in a duct transporting a vapor stream carrying liquid droplets from a boiler to a turbine in a Rankine cycle electric generating system to provide for removal of the liquid droplets from the stream in accordance with the invention;

FIG. 6 is a fragmentary cross section of a surface of revolution for a view taken generally along line 6—6 of the apparatus shown in FIG. 5;

FIG. 7 is a fragmentary cross section view taken in the area enclosed by line 7—7 of the apparatus shown in FIG. 5;

FIG. 8 is a fragmentary view, partially in section, taken in the area enclosed by line 8—8 of the apparatus shown in FIG. 5;

FIGS. 9a and 9b are schematic views, partially in section, illustrating the use of a porous medium in an annular duct transporting a droplet-containing vapor stream from a boiler to a turbine in a Rankine electric generating cycle to provide a vapor-liquid separator in accordance with the present invention;

Figure 1:
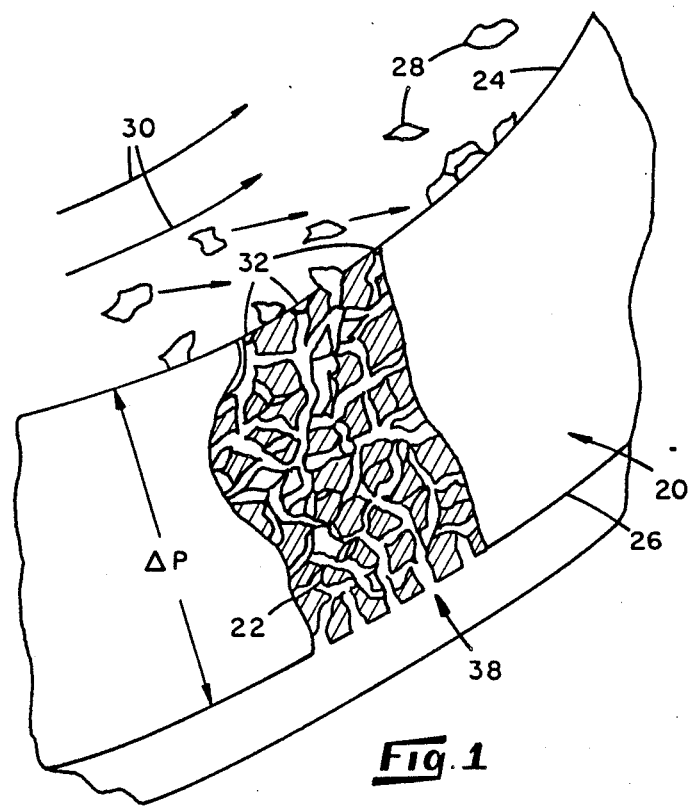
FIG. 1 is a schematic view illustrating removal of liquid droplets carried in a flowing vapor stream using a porous medium in accordance with the present invention.

Briefly, in accordance with one aspect of the present invention an apparatus is provided for separating fluid droplets carried in a gas flowing at subsonic velocities. The apparatus comprises a conduit for directing a flow of the gas through the apparatus, the conduit being defined by internally facing, generally smooth-surfaced walls exposed to and in contact with the gas stream flowing therethrough. The walls of the conduit define a series of successive arcuate bends for smoothly flowing the gas through an arcuate path so as to avoid conditions giving rise to flow separation, turbulence and excessive pressure drops occasioned thereby. The radii of curvature of successive bends lie generally in a plane and generally on opposite sides of the flow path of the gas as viewed perpendicular to the plane to thereby cause generally opposite directed successive changes in direction of the gas for encouraging transverse movement of the droplets relative to the local gas flow direction toward and into contact with walls of the conduit by centrifugal force. A porous medium is defined on at least a portion of the internally facing walls of the conduit. The porous medium is wettable by the fluid droplets carried in the gas streams such that menisci are formed in the pores thereof by the liquid wetting the medium. The pores communicate between the conduit and a liquid collection space disposed outside of the conduit and the porous medium is situated within the conduit along the walls such that droplets contacting the walls wet the medium and move into the pores thereof and form menisci therein. A first flow control apparatus is provided for maintaining movement of liquid in the pores of the porous medium toward the liquid collection space and away from the conduit at a rate which is sufficient to substantially prevent the accumulation of a liquid layer on the surface of the porous medium exposed to the flowing gas but without overcoming the surface tension force of the liquid menisci in the pores adjacent to the exposed surface. A second flow control apparatus maintains the flow velocity of the gas moving through the conduit substantially subsonic to avoid shock waves and turbulent flow conditions so that pressure losses accompanying passage of the gas through the conduit are minimized.

In a preferred embodiment, the conduit is provided by successive opposed pairs of spaced-apart flow diverters disposed relative to one another to cause gas to flow between a first pair thereof and then between a next, subsequent pair thereof. Each of the flow diverters defines a curved surface facing the gas flow with one of the flow diverters of each pair defining a concave surface facing the flow and the other defining a convex surface facing the flow generally on the opposite side thereof from the concave surface. The porous medium is disposed on the concave surfaces and may also be employed on the convex surface. The first pair of flow diverters collectively defines a first bend for directing the gas flow arcuately between the concave and convex surfaces thereof with a radius of curvature located to one side of the flow path. The next, subsequent pair of flow diverters collectively defines a second bend for directing the gas flow arcuately between the concave and convex surfaces thereof with a radius of curvature lying generally in the plane containing the radius of curvature of the first bend and disposed generally on the opposite side of the flow path from the radius of curvature of the first bend. The flow diverters in accordance with this embodiment of the invention are preferably provided by discrete air-foil-shaped members having a porous medium disposed over the outer surfaces thereof.

One particularly advantageous embodiment of the invention involves the reduction in rotor blade erosion and power losses associated with liquid dribble from stator blades located in a turbine. Conventionally, turbines such as are used in electric power plants have a rotor mounted for rotation on an axis to produce power with rotor blades for receiving a force from a flow of gas to induce rotation of the rotor. Stator blades are disposed adjacent to the rotor blades for directing the flow of gas toward the rotor blades in a manner which maximizes the force imparted thereto. The gas typically has a condensable component which tends to accumulate in liquid form on the stator blades. The accumulated liquid in turn has a tendency to form droplets that separate from the stator blades and are carried into contact with the rotor blades to cause rotor blade erosion and power losses. In accordance with this aspect of the invention, a porous medium is disposed on the surface of the stator blades in conformity with a predetermined curvature thereof and is situated adjacent a location at which the liquid accumulates on the surfaces of the blades. The porous medium is wettable by the liquid and has pores extending therethrough from the outwardly exposed surface thereof and in fluid flow communication with a liquid collection device. Apparatus is provided for maintaining a flow of the liquid into and through the pores of the porous medium to the liquid collection device. As a result, dribble from the stator blades is reduced to thereby reduce rotor blade erosion and power losses occasioned thereby.

Referring now to the drawings, FIG. 1 illustrates one aspect of a method for the removal of liquid droplets carried in a flowing gas or vapor stream in accordance with a preferred form of the present invention. There, a porous medium 20 having a predetermined permeability contains a number of channels or pores 22 that open to opposite first and second porous surfaces 24 and 26. In the embodiment of FIG. 1, the pores 22 are substantially interconnected, but such is not required. First surface 24 is exposed to a flowing vapor stream carrying liquid droplets 28.

In accordance with this aspect of the invention, the configuration of first porous surface 24 is curved so that the vapor flowing adjacent to the first surface 24 is conducted along a curvilinear flow path indicated by the direction of arrows 30. According to well-known principles of fluid dynamics and particle/gas interaction in a flowing stream, the liquid droplets 28 carried in the stream are subjected to a centrifugal force as a result of the changing direction of the vapor stream adjacent to the first surface 24. In the illustrated embodiment, this causes the droplets 28 to be moved in the direction of the first porous surface 24, transversely to the direction of the vapor flow. A portion of the transversely moving droplets contact the first surface 24, wet the medium 20, and enter the pores 22 to form menisci 32 adjacent the surface 24.

In accordance with the present invention, it is assured that the liquid entering the pores 22 and forming the menisci 32 moves through the medium 20 from the first surface 24 to the second surface 26 at a rate that is sufficient to substantially prevent the accumulation of liquid on the first surface without overcoming the surface tension force of liquid wetting the pores and forming the menisci adjacent the first surface, while simultaneously ensuring that "fresh" liquid deposited on the surface 24 is taken up in the pores 22 to avoid a buildup of a liquid film on the surface 24.

In the preferred embodiment, movement of liquid through the medium 20 away from the first surface 24 is accomplished by capillary action and by maintaining a pressure differential $\Delta P$, as shown in FIG. 1, between the region occupied by vapor adjacent the first porous surface 24 and the region occupied by fluid adjacent the second porous surface 26. A preferred means for providing this pressure differential $\Delta P$ will be described subsequently.

As schematically illustrated in FIG. 1, a balance is achieved between the quantity of liquid contacting the first porous surface 24 and wetting and filling pores 22 adjacent to the surface, and the quantity of liquid draining out of pores opening adjacent the second surface 26, shown exiting in the form of the bubble-free liquid stream 38 in FIG. 1. As a consequence, there is essentially no net accumulation of liquid on the first porous surface 24 so that reentrainment of liquid contacting and wetting the porous medium 20 is minimized. Additionally, the pores 22 that are adjacent to the first surface 24 remain substantially filled with liquid and the menisci 32 formed therein remain substantially unbroken to provide a liquid barrier in the porous medium 20 against the passage of vapor.

The liquid droplets 28 may be any type of liquid substance carried in a vapor stream and may be composed of a substance that is different from or the same as the vapor flowing adjacent to the first porous wall 24. That is, the liquid droplets 28 may be water and the vapor may be steam, or the liquid droplets 28 may be liquid potassium and the vapor may be potassium vapor. These two vapor-liquid conditions may arise, for example, in a Rankine cycle in which recently vaporized material is being transported as a mixture of vapor and liquid to expansion and cooling in the turbine section, or where local condensation is occurring adjacent to the surface of a turbine stator blade. The liquid may be water and the transporting gas may be air or another compatible gaseous material as might occur in refrigerated gas streams. The invention may be adapted for use in any of these circumstances and embodiments disclosing approaches for separating the liquid from the vapor in these circumstances in accordance with the present invention are described below.

The material comprising the porous medium 20 must, of course, be compatible with the substance comprising the vapor and the liquid. A porous medium 20 that is compatible with the substance of the vapor and liquid is not subject to significant corrosion or other structural problems under the prevailing conditions, and is either inherently readily wetted or can be made to be wetted by the liquid. For example, in the case of a typical Rankine cycle employed in a steam power plant, the material should be compatible with and readily wettable by water and be structurally sound at temperatures up to 1000° Rankine. In the boiling potassium Rankine cycle, the material of the medium 20 should be compatible with potassium, easily wetted by liquid potassium, and have desirable properties at temperatures of 2000° Rankine or higher. In a more specific vein, the material should be such that liquid contacting the surface readily wets and fills the pores 22 under the prevailing conditions of temperature, pressure, and velocity to form the menisci 32 adjacent the surface 24. Of course, as noted hereinafter, the average pore diameter in the porous medium influences the action of the menisci 32 in the pores 22.

The porous medium 20 may be made from many different materials and take on numerous forms within the scope of the invention. Specific materials which may be used depending on the circumstances include nickel, stainless steel, iron, Hastalloy, tungsten, tantalum, niobium, vanadium, copper, aluminum, cobalt, Inconel, molybdenum, titanium, silicon, nickel aluminide, silicon dioxide, titanium dioxide, aluminum oxide, zirconium oxide, magnesium oxide, and nickel oxide. The porous nature of the material may be imparted by forming the medium in a sintering process and the particles for sintering may be in the form of powder, fiber, whisker, platelets, or some combination thereof; or the porosity may be imparted by fabricating the pores in the material or by providing the material in the form of a mesh, cloth, or other assemblage.

A preferred commercially available source of material for use in providing the medium 20 is the layered alpha-alumina or gamma-alumina material with fabricated pores sold under the trademark Membralox by the Aluminum Company of America. A particularly preferred commercially available material is the product made from single or multiple layers of 316 or 316L stainless steel wire cloth or perforated plate, diffusion bonded into a single structure and sold under the trademark Dynapore by the SNC Systems Division of Michigan Dynamics, Inc., of Rock Hill, S.C. Major properties of both the Membralox and Dynapore materials are provided in Table I.

TABLE I

Major Properties of Preferred Materials for Use in the Porous Media

| | Membralox Material | Dynapore Material |
|---|---|---|
| Trademark | Membralox | Dynapore |
| Membrane Material | Alpha-$Al_2O_3$ Gamma-$Al_2O_3$ | 316 or 316L stainless steel |
| Support Material | Alpha-$Al_2O_3$ | 304 SS Perf plate |
| Pore size, $\mu$m | 0.004 and up | 2 and up |
| Volume flow rate of water at room temp. gpm/ft$^2$/at one psid | | |
| Pore size = 0.005 $\mu$m | 2.8 × 10$^{-4}$ | n/a |
| Pore size = 0.2 $\mu$m | 0.0841 | n/a |
| Pore size = 2 $\mu$m | n/a | 133 |
| Pore size = 10 $\mu$m | n/a | 271 |
| Pore size = 15 $\mu$m | n/a | 693 |
| Maximum operating pressure, psid | 365 | 50 for 4-in tubes 3100 for 0.55-in tube |
| Burst pressure, psi | 1450 (support material) | 870 for 4-in tubes 7060 for 0.55-in tube |
| Formability | limited | good |
| Resistance to corrosion | limited | yes |
| Cleanability | backflush with pulsing | backflush with pulsing |
| Area needed for reference case, $^a$ in.$^2$ (2 $\mu$m pore, 1 psid) | 2020 (est) | 13 |

$^a$Reference case is for a 2 MW potassium cooled space power systems operating at 2000° R with a vapor flow rate of 8400 lbm/hr and a vapor quality of 25% (entrained liquid flow rate of 25,000 lbm/hr or 78 gpm). Estimate of area must take into account the permeability of the porous material at the applicable temperature, not room temperature.

The permeability of the porous material is an important factor in providing for the required flow rate through the medium 20. The material should permit a sufficient flow rate of the liquid so that liquid accumulation on the first surface 24 is substantially prevented, and at a $\Delta P$ that does not overcome the surface tension force of the liquid filling and wetting the pores and forming menisci 32 adjacent to the surface.

The fluid flow through a porous medium is determined by the well-known empirical Darcy's law as follows:

$$\frac{m}{A} = K \frac{\rho}{\mu} \frac{P}{z},$$

where m/A is the flow rate per unit area, $\mu$ is the fluid dynamic viscosity, $\rho$ is the fluid density, $\Delta P/\Delta z$ is the pressure gradient across the porous material, and K is the empirical quantity called "permeability".

Permeability is the ability of a porous material to pass fluid (vapor or liquid) through its pores. The porosity of a material is the percent void per unit volume of the material. The permeability is thus a function of porosity, pore size, pore interconnection, pore material, and fluid characteristics. Permeability from Darcy's law has the dimension of area. For commercial products, however, the permeability is usually given in terms of the flow rate of water across the porous material as manufactured. In these cases, the actual quantity given is, from the Darcy expression, $$\frac{K}{\mu_l} = \frac{m}{A} \frac{1}{\rho_l} / \frac{\Delta P}{\Delta z}.$$

The right-hand side of the above expression has the units of volume flow per unit area per unit pressure drop across the porous material. Table II shows the permeabilities of the Membralox and Dynapore material described above which are preferred materials for use in providing the porous medium 20 of the invention.

TABLE II

Permeability of Preferred Porous Materials In Comparable Units (The Factory-Quoted Value is Underlined)

| | liter/hr/m$^2$ at one bar | gpm/ft$^2$ at one psid |
|---|---|---|
| Membralox | | |
| 0.004 $\mu$m pore | 10 | 2.8 × 10$^{-4}$ |
| 0.2 $\mu$m pore | 3000 | 0.08 |
| 2 $\mu$m pore | 3 × 10$^4$ (est.) | 0.8 (est.) |
| Dynapore | | |
| 2 $\mu$m pore | 4.8 × 10$^6$ | 133 |
| 10 $\mu$m pore | 10.1 × 10$^6$ | 271 |
| 15 $\mu$m pore | 26 × 10$^6$ | 693 |

In terms of the pore size, which is a critical factor in determining the permeability for a given liquid/porous medium system, it is noted that in typical Rankine cycles which employ water or potassium as the heat transfer fluid, material having a pore size of from about 2 to about 20 micrometers is preferred. Other pore size ranges may be optimal for other liquid/porous medium systems. The Dynamore material is particularly well suited for use in the present invention because of its relatively high permeability and low pressure drop at the 2 micrometer pore size.

Another important factor in selecting the material for the porous medium 20 is the prevention of vapor breakthrough. As discussed above, the present invention aims at eliminating passage of vapor through the porous medium 20 while at the same time insuring substantially complete and prompt removal of liquid contacting and wetting the medium on the first porous surface 24. If the force inducing movement of liquid through the medium 20 is too high, the liquid surface tension will be overcome causing the menisci 32 to be ruptured resulting in vapor breakthrough. This is not only deleterious to the liquid-removing efficiency, but can also result in malfunction of a device used to induce fluid movement.

The value for the pressure differential across the porous medium 20 beyond which vapor will break through is:

$$\Delta P_{max} = \frac{4\sigma}{D}$$

where $\sigma$ is the surface tension of the liquid in pounds force/foot and D is the average pore diameter. Values for $\Delta p$max for various pore diameters (in ft.) for potassium at 2000° Rankine (typical for a space power boiling potassium reactor), water at 1000° Rankine (typical for a utility power plant boiler), and water at 550° Rankine (typical for a laboratory air-water flow experiment) are shown below in Table III.

TABLE III

Vapor Breakthrough Pressure For Various Pore Sizes and Liquid Media

|  | Potassium at Zero Gravity Conditions | Water at Boiler Conditions | Water at Room Conditions |
| --- | --- | --- | --- |
| Temperature, °F./°R | 1540/2000 | 540/1000 | 90/550 |
| Pressure, psi/bar | 29/2 | 1000/69 | 14.7/1 |
| Liquid properties |  |  |  |
| Density, lbm/ft$^3$ | 40.2 | 46.3 | 62 |
| Dyn. viscosity, lbm/hr. ft | 0.3 | 0.22 | 2 |
| Kin. viscosity, ft$^2$/hr | 7.46 E-3 | 4.75 E-3 | 3.28 E-2 |
| Surface tension, lbf/ft | 4.12 E-3 | 1.58 E-3 | 4.90 E-3 |
| Vapor breakthrough pressure, psid |  |  |  |
| Pore = 0.2 μm nom., 5 μm max | 6.96 | 2.68 | 8.30 |
| Pore = 2 μm nom., 10 μm max | 3.48 | 1.34 | 4.15 |

The pressure differential limits of 3.48 psi, 1.34 psi, and 4.15 psi for the illustrated systems are believed to be adequate for practicing the present invention.

Figure 2:
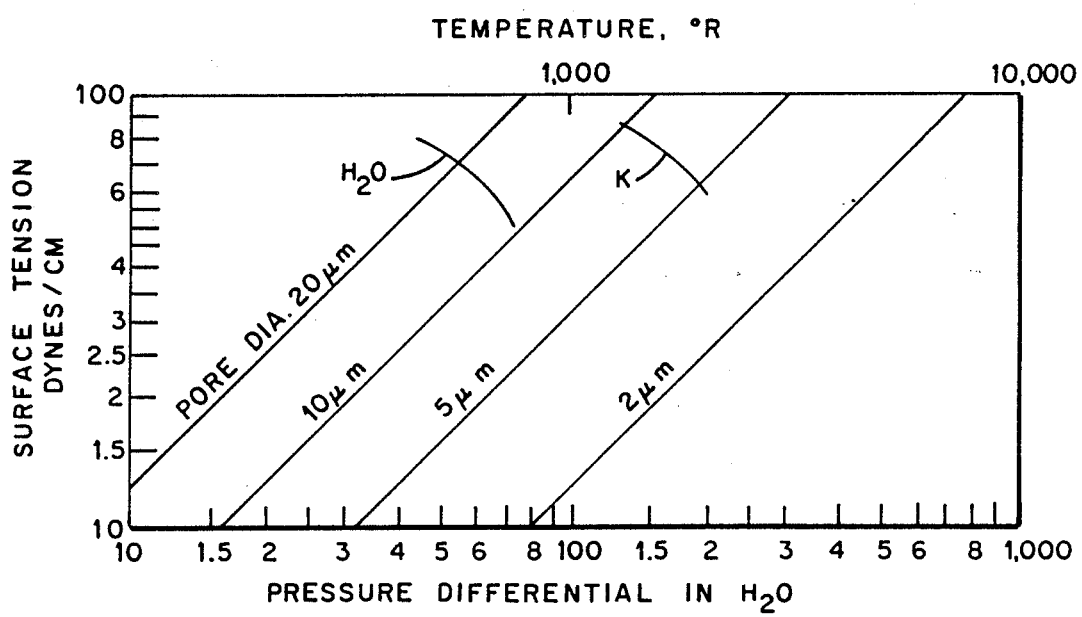
FIG. 2 is a graphical illustration depicting relationships between surface tension, temperature and pressure differential for different liquids forming menisci in pore diameters ranging from 2 to 20 micrometers.

A chart relating surface tension, pore diameter, temperature, and pressure differential for water and potassium as heat transfer fluids is provided in FIG. 2. As described above, the pressure differential that can be sustained by the surface tension in the liquid meniscus at the inlet to a pore filled with liquid is directly proportional to the surface tension and inversely proportional to the pore diameter. The surface tension varies from one liquid to another, and, for any given liquid, it varies with temperature.

FIG. 2 shows the relations between the parameters to facilitate the estimation of the maximum pressure differential or $\Delta p$max for a typical range of pore sizes and for the normal operating temperature range of each of the heat transfer fluids illustrated. To use the chart of FIG. 2, the liquid is chosen and the operating temperature desired to determine the surface tension is selected. For this surface tension, the $\Delta p$max can be found for the pore size chosen. That is, enter the chart of FIG. 2 on the top horizontal scale at the desired temperature in degrees Rankine, go vertically downward to the curve for the liquid chosen, and read the surface tension in dynes/cm from the scale at the left. Then, move to the right or left for that surface tension to the pore size defined by the system of slanting parallel lines, and read the pressure differential sustainable in inches of water on the bottom scale.

Figure 13A:
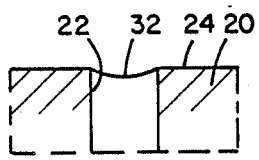
FIGS. 13a through 13d are schematic views illustrating changes in the configuration of a liquid meniscus in a pore of a porous medium as the pressure differential across the liquid changes.
Figure 13B:
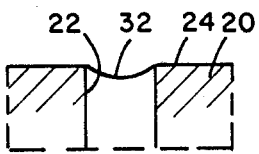
Figure 13C:
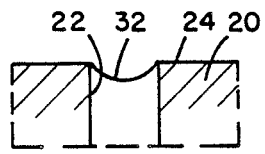
Figure 13D:
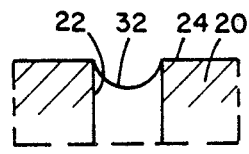

The change in configuration of the menisci 32 as the $\Delta_p$max is approached is illustrated schematically in FIGS. 13a through 13d. FIG. 13d shows the menisci 32 at the $\Delta p$max and FIG. 13b shows the menisci 32 at about ½ $\Delta_p$max, which is a preferred operating point. FIG. 13c shows the menisci 32 at about ¾ $\Delta_p$max and in FIG. 13a the menisci are at about ¼ $\Delta_p$max, and it is preferred that the $\Delta P$ be maintained in this range. The pore size that will develop the desired menisci configuration under the particular conditions can be selected from FIG. 2.

The above discussion idealizes pore size. In some materials the surface pore may be larger (or smaller) than the idealized pore. However, the proper (or chosen) pore size must exist at some point in any large channel through the porous material. If a smaller pore size exists, that channel's pressure drop will be higher. Since, under any given set of operating conditions, the pressure gradient is fixed, this channel will tend to penalize permeability, so smaller pores are undesirable. If a larger pore completely penetrates the material, vapor breakthrough will occur at a pressure gradient that has been chosen based on nominal pore size.

Another factor involved in the selection of the material for the porous medium 20 is the surface area required to remove liquid droplets contacting and wetting the pores adjacent to the surface 24. Assuming that 100 percent of the liquid contacting the surface 24 wets the pores adjacent to the surface, the surface area needed may be calculated by dividing the entrained liquid mass flow rate by the permeability of the material. Table IV shows of Table III, assuming a pressure differential of 50% of $\Delta_p$max.

TABLE IV

Minimum MLT Surface Area Calculations (membrane has 2 μm nominal pore)

|  | Potassium Cycle Space Power System | Earthbound LWR Power Plant | Laboratory Air-Water Rig |
| --- | --- | --- | --- |
| Selected Power, MWt | 2 | 3200 | n/a |
| Vapor flow rate |  |  |  |
| lbm/hr | 8400 | 14.7 E6 | 2800 |
| cfm | 2580 | 1.13 E5 | 640 |
| ft/sec at boiler exit | 100 | 100 | 100 (Blower) |
| ft/sec at turbine exit | 1036 | 1036 | n/a |
| Liquid flow rate |  |  |  |
| (lbm/hr) (gpm) |  |  |  |
| 25% vapor quality | 2.52 E4/78.2 | 4.41 E7/1.19 E5 | 8181/16.7 |
| 40% vapor quality | 1.26 E4/39.1 | 2.21 E7/5.95 E4 | 4090/8.4 |
| 90% vapor quality | 930/2.88 | 1.60 E6/4397 | 303/0.6 |
| 95% vapor quality | 440/1.36 | 0.77 E6/2084 | 143/0.3 |
| MLT Membrane |  |  |  |
| Pore size, m nominal | 2 | 2 | 2 |
| Pore size, m max | 10 | 10 | 10 |
| Assumed pres diff, psid | 1.74 | 0.67 | 1 |

TABLE IV-continued

| Minimum MLT Surface Area Calculations (membrane has 2 μm nominal pore) | | | |
|---|---|---|---|
| | Potassium Cycle Space Power System | Earthbound LWR Power Plant | Laboratory Air-Water Rig |
| Permeability, gpm/ft$^2$ | 1543 | 810 | 133 |
| Minimum MLT membrane area, ft$^2$ | | | |
| 25% to 90% vapor quality | 0.5 | 141 | 0.12 |
| 90% to 95% vapor quality | 0.001 | 2.8 | 0.002 |

FIG. 3 illustrates use of a porous medium 50 to remove liquid from a stator blade 52 located in the turbine portion of a Rankine cycle electric generating system which is a particularly advantageous embodiment of the present invention for achieving both droplet separation and removal of accumulated moisture from the blades. In this regard, it is noted that there is essentially universal agreement that turbine bucket erosion is not caused by the impact of microscopic droplets that condense from the vapor in the course of its expansion it passes through the turbine. Instead, such erosion is caused by large diameter droplets which coalesce from moisture accumulating on the stator blades and which dribble from the trailing edge of the stator blades into the path of the fast moving rotor blades. These large diameter secondary droplets can range in size from 50 to several hundred microns.

It has been found that the liquid film tends to form primarily on the concave surface 54 of the stator blades 52. Accordingly, in the illustrated embodiment, the porous medium 50 is in the nature of an insert provided on the concave surface 54 although the insert may be provided on both the concave and convex surfaces. The medium 50 may be secured at its ends using electron beam welds 57. The shape of the medium 50 conforms to the shape of the surface 54 so that a predefined vapor flow path indicated by the direction of arrow 59 adjacent to the surface 54 is not significantly altered.

Liquid droplets carried in the vapor, as well as those resulting from condensation, contact and wet the porous medium 50, move by capillary forces promptly into a pore opening to a first or an outer surface 56, through the thickness of the medium, and out a second or inner porous surface 60 in the manner depicted and described above with reference to FIG. 1.

Liquid moving out of the inner surface 60 is collected in axial channels 61 which are interconnected to provide flow passages to an outlet point illustrated schematically at 62. For terrestrial applications, liquid can be drained by gravity using a siphoning technique or by other suitable means. Under zero gravity conditions in space, and in other applications, removal of collected liquid from the stator blade 52 may be accomplished as illustrated schematically in FIG. 3 using a conduit 63 which is connected between outlet 62 and a pump unit 64 configured to induce fluid movement through the insert 50 by creating a pressure differential ΔP as described above with reference to FIG. 1.

Figure 12:
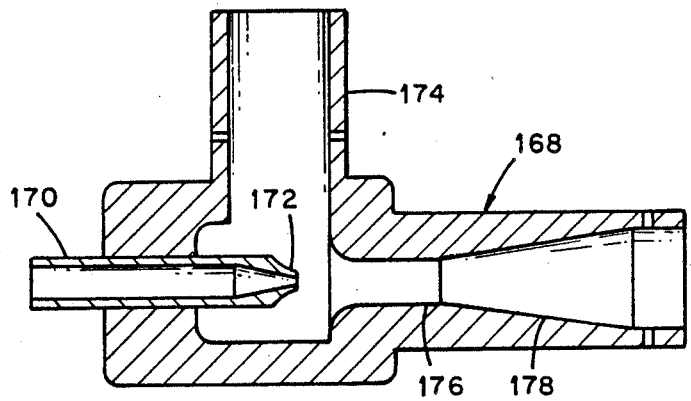
FIG. 12 is an elevational view in cross section of a jet pump for use in embodiments of the present invention.

Pump unit 64 preferably is provided by a jet pump, particularly in zero gravity conditions, and one form of a suitably configured pump is illustrated in FIG. 12 to be discussed subsequently. Power for the pump unit 64 is indicated at 66 and may, in the case of a jet pump, be provided using the output of the boiler feed pump in a potassium Rankine cycle system and conducted to the pump unit 64 through conduit 68. The outlet of the unit 64 may be recirculated to the system boiler, indicated schematically at 70, by means of conduit 72.

By providing for rapid and effective removal of accumulated moisture from the stator blades, this embodiment enables significant reduction in rotor blade erosion problems without a significant concomitant power loss (pressure drop) such as may exist with other separation schemes. In fact, the embodiment is expected to provide a significant power gain because the avoidance of dribble from the stator reduces the drag force experienced by the rotors as a result of the entrained liquid.

In addition to use of the porous medium 50 in the stator blades located in a turbine section as illustrated in FIG. 3, the invention also contemplates the use of porous medium inserts at the boiler outlet in the form of a series of successive airfoil-type members or flow diverters constructed similarly to the stator blade and designed to divert the flow sufficiently to achieve the necessary transverse droplet movement while providing substantially unobstructed passageways for minimizing flow separation and pressure drop. Each individual path of the flow through successive pairs of diverters constitutes a conduit defining successive bends for smoothly changing the direction of the gas stream moving therethrough so as to avoid conditions which may give rise to flow separation and any attendant turbulence and pressure drop occasioned thereby. The radii of curvature of successive bends within the conduit lie generally within a plane and generally on opposite sides of the flow path as viewed perpendicular to the plane so as to cause generally oppositely directed successive changes in direction of the vapor for encouraging transverse movement of the droplets relative to the local gas flow direction, and toward and into contract with the walls of the divertors by centrifugal force. One means of accomplishing this is illustrated in FIG. 4a where a first row of divertors in the general shape of airfoil blades 74 directs the vapor-liquid stream from a boiler unit indicated schematically at 73 along a curvilinear flow path representing a change in flow direction of approximately 45° which is the approximate difference in direction between flow direction arrows 75' and 75". Airfoil blades 76 arranged in a second row are immediately downstream of the first row of airfoil blades 74, and are oriented with respect to one another and to blades 74 to direct the vapor-liquid stream through a change in direction of approximately 90° as indicated by the difference in direction between flow direction arrows 75" and 75'''. Additional rows of airfoils may be used. The surfaces of the airfoils 74 and 76 facing the flow are provided with porous medium inserts generally as shown in FIG. 3 to remove moisture contacting and wetting the concave and convex surfaces.

As indicated in FIG. 4b, the first and second rows of airfoils 74 and 76 may also be arranged to provide two 90° changes in direction by disposing the first row 74 at an approximately 45° angle with respect to the approaching flow as indicated by arrows 75'. Consequently, flow direction arrows 75" are at about a 90° angle with respect to flow direction arrows 75'. Flow exiting the second row 76 proceeds as indicated by the direction of arrows 75'" which ar substantially perpendicular to flow direction arrows 75" representing the direction of flow movement between rows of blades 74 and 76.

It is noted that in the arrangement illustrated in FIG. 4, as with any vapor-liquid separator constructed in accordance with the invention, the turning radius of the bends should be as small as practicable to maximize the centrifugal force, while the turning angle should be as large as practicable to give the droplets sufficient time to move transversely across the streamlines of the vapor stream and contact the porous medium. Second, to minimize both pressure losses and large-scale turbulence which could carry particles approaching or residing on the porous medium back into the center of the stream, flow separation should be minimized. The latter requirement favors an annular passage to avoid the secondary and three-dimensional flows stemming from end-wall effects; and the ratio of the outer radius to the inner radius in the bend is preferably no greater than about 1.5 to reduce the adverse pressure gradient along the inner wall of the bend and thus the tendency toward flow separation and the resulting large scale turbulence.

In addition, it is noted that the vapor introduced from the boiler unit 73 into the arrangement of porous blades will typically be moving at a velocity that is considerably subsonic, usually in the range of Mach 0.1 to Mach 0.7. In accordance with the invention, such velocities are found to yield surprisingly good separation efficiencies of over about 85% for droplets having a size in the range of from about 5 to about 20 µm. In fact, the invention yields separation efficiencies over 95% for droplet diameters over 60 microns with a pressure drop less than about 10% of the inlet dynamic head at velocities below about Mach 0.3, which is therefore a preferred velocity limit for practicing the invention. For example, Table 5 shows the separation efficiencies which are achieved through use of a series of successive pairs or banks of airfoils forming a flow conduit as described above with reference to FIG. 4 and defining two oppositely directed 90. bends as in FIG. 4b. In each bank, the opposed concave and convex surfaces of the blades were defined by a layer of the Dynamore material described above.

| Run # | Inlet Quality % | Test Sect. Vel. ft/s | Droplet Size µm | % of Total Feed Removed by 1st Bank | % of Total Feed Removed by 2nd Bank | Separator Pressure Drop (in H₂O) |
|---|---|---|---|---|---|---|
| 3 | 99.4 | 152 | 20 | 92.4 | 3.2 | — |
| 5 | 99.4 | 152 | 20 | 83.0 | 4.0 | — |
| 6 | 99.1 | 152 | 16 | 75.9 | 9.0 | — |
| 7 | 99.7 | 152 | 7 | N/A* | N/A* | — |
| 8 | 99.8 | 152 | 21 | 85.0 | 1.2 | — |
| 10 | 99.1 | 94 | 20 | 75.8 | 8.3 | — |
| 11 | 98.6 | 94 | 16 | N/A** | N/A** | 0.9 |
| 14 | 99.5 | 94 | 7 | N/A* | N/A* | 0.6 |
| 15 | 99.5 | 94 | 7 | N/A* | N/A* | 1.2 |
| 16 | 98.5 | 94 | 16 | 70.9 | 15.3 | 0.9 |
| 17 | 99.2 | 61 | 7 | N/A* | N/A* | 0.2 |
| 20 | 99.7 | 152 | 7 | N/A* |  | 2.6 |
| 21 | 98.6 | 65 | 20 | 77.4 | 11.4 | 0.4 |
| 22 | 98.7 | 65 | 20 | 74.7 | 11.2 | 0.4 |
| 23 | 97.9 | 65 | 16 | 71.9 | 13.7 | 0.4 |
| 24 | 99.1 | 152 | 16 | 74.8 | 9.7 | 2.7 |
| 25 | 97.9 | 65 | 16 | 71.5 | 14.0 | 0.3 |
| 26 | 99.3 | 65 | 7 | N/A* | N/A* | 0.3 |
| 27 | 98.7 | 65 | 20 | 71.2 | 12.5 | 0.4 |
| 29 | 99.4 | 157 | 20 | 80.1 | 9.4 | 2.5 |

*Poor material balance
**No material balance

The data shows a very high overall average separation efficiency of 85% even though the velocities of the vapor moving through the device are relatively low with Mach numbers in the order of 0.06 to 0.15 Mach. Also, it is to be noted that a very low pressure drop was measured through the banks during the tests, ranging from about 0.2 to about 2.7 in. H₂O. Under these conditions of relatively high separation and relatively low pressure drop, the invention represents an excellent approach for achieving separation of liquid droplets contained in the vapor at a boiler outlet in a power plant context and in the stator blades used in the turbine section as described above.

FIGS. 5 through 8 illustrate further embodiments of the present invention for removing liquid droplets carried in a vapor stream at the outlet of a boiler in a Rankine steam or potassium vapor cycle. In these figures, a separator section indicated generally at 80 includes apparatus for separating liquid droplets from the vapor stream in accordance with one form of the invention. The separator section 80 is placed between duct sections 82 and 84 passing a vapor-liquid stream upward from the outlet of the boiler to the turbine section.

As illustrated in FIGS. 5 and 6, the separator section 80 includes a downwardly facing cone portion 86 which directs the flow radially outwardly into inlet openings 88 of a plurality of annularly arranged conduits or passageways 90, a portion of which are illustrated in FIG. 6. The passageways are designed to achieve the necessary transverse droplet movement and minimize flow separation and pressure drop through the use of appropriate geometry and substantially unobstructed passageways as described above. In FIGS. 5 and 6, each passageway 90 contains two approximately 90° bends and has an exit opening 92 axially spaced from, and circumferentially shifted with respect to, the inlet opening 88. The passageways 90 are approximately rectangular in cross-section (slightly wider at outer radius), and are lined along their length with a conforming porous medium 94 to remove liquid droplets suspended in the vapor-liquid stream as illustrated and described above with reference to FIG. 1.

The medium 94 in each passageway 90 includes an outer surface 96 adjacent to the flow, corresponding to first surface 24 of FIG. 1, and an inner surface 98 out of which the removed liquid passes, corresponding to second surface 26 of FIG. 1. The medium 94 is supported in a suitable fashion such as the illustrated lands 100 spaced to provide a liquid drainage network in spaces 101 adjacent to the inner surface 98, while the lands provide support of the medium 94 to maintain the desired configuration under the dynamic pressure force of the fluid flowing through the passageway 90. Liquid movement throughout the medium 94 occurs via capillary action as mentioned above, and movement of the liquid through the medium 94 away from the outer surface 96 in accordance with the invention is preferably accomplished by creating a pressure differential as described above with reference to FIG. 1. A preferred means for creating the pressure differential, particularly under zero gravity conditions, is a jet pump, one form of which is shown in FIG. 12 to be described subsequently.

The cone portion 86 of the separator 80 may also be lined on its outer surface with a layer of porous medium 107 as shown in FIG. 7. The vapor-liquid stream flowing radially outward toward the annular arrangement of inlet openings 88 will, because of its changing direction, tend to cause movement of liquid droplets transversely of the flow direction by centrifugal force. A significant portion of these liquid droplets contact and wet the layer of porous medium 107 on the cone 86 and are removed from the medium 107 as described above with reference to FIG. 1. The porous medium 107 may be supported on lands 108 spaced so as to provide a fluid drainage network in gaps 109 between the lands 108 for draining fluid moving through the medium 107.

FIG. 8 illustrates interconnection of the spaces 101 adjacent to the medium 94 between the lands 100 to direct removed liquid to a plenum 112 from which it is passed through conduit 114 to the pressure differential producing means.

FIGS. 9a and 9b illustrate another form of the present invention involving removal of suspended liquid droplets carried in a vapor stream exiting a boiler. Each figure is a one-half view of an annular duct arrangement provided at the boiler outlet in much the same manner as the separator section 80 of FIG. 5. In FIG. 9a, for example, one-half of a cone-shaped portion 110 is represented and corresponds to the cone-shaped portion 86 of FIG. 5. And, one half of a cone-shaped portion 111 is shown in FIG. 9b, also corresponding to cone-shaped portion 86 of FIG. 5. The outer surfaces of the cone portions 110 and 111 preferably are lined with a porous medium in accordance with the invention as described above in FIG. 7. (The porous medium is omitted from portions 110 and 111 in FIGS. 9a and 9b for clarity.)

The separator configuration in both FIGS. 9a and 9b is selected to provide two 90° changes in direction for the flow similar to that of the passageways 90 illustrated in FIG. 6. However, in FIGS. 9a and 9b, the initial 90° change in direction is radially inwardly of the cone portions 110 and 111 and the flow is not divided. Instead, it is maintained in a continuous annular conduit or channel as it traverses the separator.

FIG. 9a illustrates incorporation of porous medium in accordance with the invention in the form of a flat ring 120 adjacent to a first bend 122. Ring 120 faces downwardly toward the flow entering the first bend 122, is placed just downstream of the outer radius of the bend, and is maintained in position by suitable means. Another section of porous medium in the shape of a band 124 is placed adjacent to a second 90° bend 126 just downstream of the outer radius of the bend, and is supported by suitable means. Spaces 128 and 130 are provided behind ring 120 and band 124. The spaces 128 and 130 are connected to a jet pump or other suitable device for creating a pressure differential ($\Delta P$) across the ring 120 and band 124 and collect liquid droplets suspended in the vapor-liquid stream which contact, wet, and are transported through the material of the ring 120 and band 124 in the now familiar manner.

In FIG. 9b, curved annular-shaped porous medium sections 134 and 136 line the passageway. Section 136 traverses the outer radius of a first bend 138 and extends along the passageway to the downstream end as the inner radius of the second bend 140. Section 134 begins at the downstream end as the inner radius of the first bend 138 and traverses the outer radius of the second bend 140. Spaces 142 and 144 behind porous medium sections 134 and 136, respectively, function in the same manner as the spaces 128 and 130 of FIG. 9a. The configuration of FIG. 9b offers the advantage of more complete coverage of the porous medium along the wall defining the passageway to insure complete removal of liquid droplets contacting the structure directing the flow of fluid through the passageway.

Figure 10:
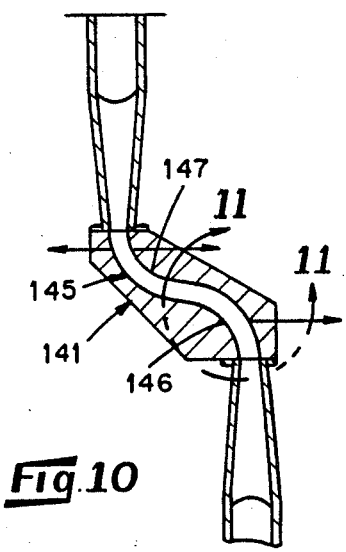
FIG. 10 is a schematic side view illustrating use of a porous medium in a duct containing two 90° bends in accordance with the present invention.
Figure 11:
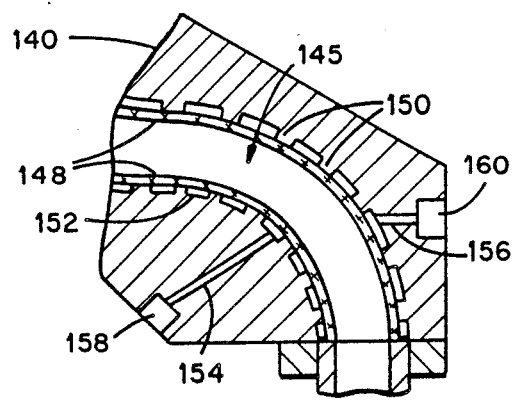
FIG. 11 is a fragmentary view, partially in section, taken in the area enclosed by line 11—11 of the apparatus shown in FIG. 10.

FIGS. 10 and 11 show another form of the invention wherein the porous medium is inserted into a single duct to separate liquid droplets carried in a flowing vapor-liquid stream. There, a separator section 141 includes a conduit or passageway 145 defining two approximately 90° smooth bends 146 and 147 to achieve transverse droplet movement which minimizes flow separation and pressure drop. As shown in FIG. 11, the passageway 145 is lined with a layer of porous medium 148, preferably provided on both the inner and outer radii of the bends 146 and 147. The medium is supported in a suitable fashion, such as the illustrated lands 150 which are spaced apart to define passages 152 which provide a liquid drainage network adjacent the inner surface of the medium 148 between lands 150. The spaces 152 are interconnected to drain collected liquid through central conduits 154 and 156 to sumps 158 and 160. Sumps 158 and 160 are connected to a jet pump or other suitable means for creating a pressure differential ($\Delta P$) across the medium 148 to move the fluid through the medium as described above in connection with FIG. 1. From there, the liquid may be recirculated to the boiler.

As mentioned above, movement of liquid through the thickness of the porous medium of the present invention away from the surface exposed to the vapor stream is preferably accomplished by maintaining a pressure differential ($\Delta P$) across the medium under the action of gravity or by using a jet pump connected to draw from the space adjacent to the surface of the medium from which the fluid is exiting in the various embodiments of the invention. Jet pumps represent a simple liquid scavenging system for use with the invention and, as will be described, are inherently stable to establish a balanced rate of flow through the medium.

One form of a jet pump 168 suitable for use in the invention is illustrated in FIG. 12. There, liquid from the output of a boiler feed pump is fed into an inlet nozzle 170 of the pump 168 as the driving stream, and it exits through opening 172 at the right-hand end of the nozzle. Liquid passing through the porous medium enters inlet conduit 174 at the top of the jet pump 168 as the stream to be driven. The high velocity of fluid exiting opening 172 of the nozzle 170 induces a low pressure zone in the throat of a venturi portion 176, drawing liquid through conduit 174 into the venturi. The fairly high velocity of the mixed stream is reduced in a venturi diffuser portion 178 to produce an increase in pressure over that of the fluid in conduit 174.

It has been discovered in accordance with the present invention that jet pumps can be used to insure that the surface tension barrier provided at the inlet to the pores 22 by the menisci 32 (See FIG. 1) will not be broken. This is a result of a subtle, but vital characteristic of jet pumps. It happens that when pumping liquids near their boiling points, a low pressure in the throat of the jet pump venturi 176 can produce cavitation and vapor bubbles that cause a marked loss in the side stream driving pressure and thus the side stream flow rate (and the porous medium $\Delta P$). By proper design and suitable subcooling of the driving stream, the jet pump can be constructed to tolerate the cavitating regime without difficulty and without cavitation erosion. Thus, a very simple and inherently stable system is provided for sucking off liquid from the space behind the porous medium without ever causing vapor breakthrough and with no need for other control devices. It is also noted that to avoid possible cavitation damage in the jet pump, the maximum designed pressure rise must be kept relatively small; but this is no handicap in the case of the present invention since the pressure differential sustainable by the surface tension of the fluid in the medium is also relatively small.

The invention which has been described herein is advantageous in that it does not require high, supersonic flow rates or turbulent flow conditions to achieve an effective separation rate. Conventional thinking favors the use of supersonic flow rates or turbulent flow regimes in order to avert particle deposition in undesired locations and for other reasons. In contrast, the present invention involves separation under conditions of laminar flow with subsonic flow velocities below about Mach 0.7 and preferably below about Mach 0.3 to avoid the creation of shock waves or other unstable flow conditions which may give rise to undesirably high pressure losses. Eddies, side currents, etc. are avoided through the use of substantially unobstructed relatively smooth-walled flow passageways that are configured to provide minimum opportunity for flow separation and pressure drop to prevent flow conditions adjacent to the surface of the porous medium that could cause reentrainment or reduce the rate at which droplets contact the medium. Thus, an overall advantage is that pressure losses are kept to a minimum while separation efficiencies are maintained at a high level. Also, for a given predetermined maximum pressure drop, a higher subsonic velocity can be employed which in turn increases the separation efficiency. The invention also uses conventional, easily obtainable equipment and materials, is simple to construct and operate, requires no moving parts, and is readily adaptable for use in a wide variety of applications.

Although preferred embodiments of the present invention have been described in the foregoing detailed description, it will be understood that the invention is capable of numerous rearrangements, substitutions, modifications and configurations without departing from the scope and spirit of the invention as set forth in the claims below.

What is claimed is:

1. The method of separating fluid droplets carried in a gas flowing at subsonic velocities which comprises;

directing the gas at a subsonic velocity at or below about Mach 0.7 through a conduit having internally facing, spaced apart curved walls defining successive bends for causing the gas to flow along successive arcuate flow paths with the radius of curvature of a first bend extending in one direction from said first bend and the radius of curvature of a next, subsequent bend lying generally in the plane containing the radius of curvature of said first bend but generally extending from said next, subsequent bend in a direction that is opposite that of the radius of curvature extending from said first bend to thereby cause generally oppositely directed successive changes in direction of the gas with a minimum pressure loss and for encouraging transverse movement of the droplets relative to the local gas flow direction and toward and into contact with said walls of said conduit;

removing liquid droplets contacting the walls of the conduit through the pores of a porous medium covering at least a portion of the walls, the pores communicating between the interior of the conduit and a liquid accumulation space located outside the conduit;

controlling the rate of movement of liquid through the pores of the porous medium to minimize accumulation of liquid on the surface thereof which faces the interior of the conduit and to maintain liquid menisci within the pores of the porous medium to avoid the passage of gas therethrough, whereby conditions giving rise to turbulent flow and shock waves are avoided to minimize pressure losses associated with traversal of the gas through the conduit for achieving separation of the liquid droplets carried therein.

2. The method of claim 1, wherein the successive bends each cause a change in direction of the gas of at least about 45°.

3. The method of claim 1, wherein the velocity of the gas flowing through the conduit is maintained below about Mach 0.3 and at least about 85% by weight of the fluid droplets are separated from the gas with a pressure drop of less than about 3 in. $H_2O$.

4. An apparatus for separating fluid droplets carried in a gas flowing at subsonic velocity which comprises:

a conduit for directing a flow of the gas through the apparatus, said conduit being defined by internally facing generally smooth-surfaced walls exposed to and in contact with the gas stream flowing therethrough, and said walls of said conduit defining a series of successive arcuate bends for smoothly flowing the gas through an arcuate path so as to avoid conditions giving rise to flow separation and any attendant turbulence and pressure drops occasioned thereby with the radii of curvature of successive bends lying generally in a plane and generally on opposite sides of the flow path of the gas as viewed perpendicular to the plane to thereby cause generally oppositely directed successive changes in direction of the gas for encouraging transverse movement of the droplets relative to the local gas flow direction toward and into contact with said walls of said conduit by centrifugal force;

a porous medium wettable by the fluid droplets carried in the gas stream such that menisci are formed in the pores thereof by the liquid wetting the medium, said porous medium being defined on at least a portion of said internally facing walls of said conduit and having pores communicating between said conduit and liquid collection means disposed outside of the conduit, and said porous medium being situated within said conduit along said walls such that droplets contacting said walls wet said medium and move into the pores thereof and form menisci therein as aforesaid;

first flow control means for maintaining movement of liquid in said pores of said porous medium toward said liquid collection means and away from said conduit at a rate which is sufficient to substantially prevent the accumulation of a liquid layer on the surface of the porous medium exposed to the flowing gas without overcoming the surface tension force of the liquid menisci in the pores adjacent the exposed surface; and second flow control means for maintaining the flow velocity of the gas moving through the conduit substantially subsonic to avoid shock waves and turbulent flow conditions so that pressure losses accompanying passage of the gas through said conduit are minimized.

5. The apparatus of claim 4, wherein said conduit is provided by successive opposed pairs of spaced-apart flow diverters disposed relative to one another to cause gas to flow between a first pair thereof and then between a next, subsequent pair thereof, each of said flow diverters defining a curved surface facing the gas flow with one of said flow diverters of each pair defining a concave surface facing the flow and the other defining a convex surface facing the flow generally on the opposite side thereof from said concave surface, said porous medium being disposed on said convex and concave surfaces, and said first pair of flow diverters collectively defining a first bend for directing the gas flow arcuately between said concave and convex surfaces thereof with a radius of curvature located to one side of the flow path and said next, subsequent pair of flow diverters collectively defining a second bend for directing the gas flow arcuately between said concave and convex surfaces thereof with a radius of curvature lying generally in the plane containing said radius of curvature of said first bend and disposed generally on the opposite side of the flow path from said radius of curvature of said first bend.

6. The apparatus of claim 5, wherein said flow diverters are discrete air-foil-shaped members.

7. The apparatus of claim 5, wherein the radii of curvature of the concave and convex surfaces of the individual flow diverters making up each of said pairs of flow diverters extend generally in the same direction and the ratio of the radius of curvature of the concave surface is less than or equal to about 1.5 times that of the radius of curvature of the convex surface.

8. In a turbine having a rotor mounted for rotation on an axis to produce power with rotor blades for receiving force from a flow of gas to cause rotation of the rotor, and stator blades disposed adjacent to said rotor blades for directing the flow of gas toward the rotor blades, the gas having a condensable component tending to accumulate in liquid form on the stator blades and the accumulated liquid having a tendency to form droplets that separate from the stator blades and are carried into contact with the rotor blades by gas directed thereat by the stator blades to cause rotor blade erosion and power losses, the improvement which comprises a porous medium disposed on the surface of the stator blades in conformity with a predetermined curvature thereof and situated adjacent to a location at which the liquid accumulates thereon, said porous medium being wettable by the liquid and having pores extending therethrough from the outwardly exposed surface thereof and in fluid flow communication with liquid collection means, and means for maintaining a flow of liquid into and through said pores of said porous medium to said liquid collection means, whereby accumulation of a liquid film on said stator blades is reduced to reduce the formation of droplets that are carried into contact with the rotor blades and thus any resulting rotor blade erosion or power losses occasioned thereby.

9. The improvement of claim 8 wherein said stator blade has generally oppositely facing concave and convex surfaces separated by the thickness thereof, and said porous medium is disposed on said concave surface.

10. The improvement of claim 8, wherein said pores have a diameter of from about 2 to about 20 micrometers and a permeability to water passage greater than about 100 gallons per minute/ft2 at one psid.

* * * * *

UNITED STATES PATENT AND TRADEMARK OFFICE
CERTIFICATE OF CORRECTION

PATENT NO. : 4,938,785

DATED : July 3, 1990

INVENTOR(S) : Robert E. MacPherson, Jr., Arthur P. Fraas and Doan L. Phung

It is certified that error appears in the above-identified patent and that said Letters Patent is hereby corrected as shown below:

Column 7, line 66, there should a dot over the "m" in formula m/A.

Column 8, line 17, there should be a dot over the "m" in formula m/A.

Column 9, line 8, delete period (.) after 2000°.

Column 13, line 6, "ar" should be -- are --.

Column 13, line 47, after "90" insert the degree symbol -- ° -- and delete the period (.) after "90".

Signed and Sealed this

Twenty-fifth Day of June, 1991

*Attest:*

HARRY F. MANBECK. JR.

*Attesting Officer*      *Commissioner of Patents and Trademarks*